United States Patent
Van Bruggen et al.

(10) Patent No.: US 7,396,792 B2
(45) Date of Patent: Jul. 8, 2008

(54) TRANSPARENT POLYCRYSTALLINE ALUMINIUM OXIDE

(75) Inventors: Michel Paul Barbara Van Bruggen, Eindhoven (NL); Rolf Theo Anton Apetz, Aachen (DE); Theo Arnold Kop, Eindhoven (NL); Andreas Krell, EindhovenDresden (DE); Thomas Hutzler, Dresden (DE)

(73) Assignees: Koninklijke Philips Electronics, N.V., Eindhoven (NL); Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 35 days.

(21) Appl. No.: 10/520,315

(22) PCT Filed: Jul. 2, 2003

(86) PCT No.: PCT/IB03/02980

§ 371 (c)(1),
(2), (4) Date: Jan. 5, 2005

(87) PCT Pub. No.: WO2004/007398

PCT Pub. Date: Jan. 22, 2004

(65) Prior Publication Data

US 2005/0248277 A1    Nov. 10, 2005

(30) Foreign Application Priority Data

Jul. 10, 2002    (EP) ................................. 02077784

(51) Int. Cl.
*C04B 35/115* (2006.01)
(52) U.S. Cl. .................... 501/153; 501/105; 313/636
(58) Field of Classification Search ................. 501/105, 501/153; 313/636
See application file for complete search history.

(56) References Cited

U.S. PATENT DOCUMENTS

| 4,285,732 A | * | 8/1981 | Charles et al. ............. 501/101 |
| 4,861,737 A | * | 8/1989 | Prud'Homme van Reine et al. .......................... 501/152 |
| 5,028,362 A | * | 7/1991 | Janney et al. ............... 264/432 |

(Continued)

FOREIGN PATENT DOCUMENTS

EP    756586    10/1995

(Continued)

OTHER PUBLICATIONS

Oh-Hun Kwon et al; "Submicrometer Transparent Alumina by Sinter Gorging Seeded Gamma—A1203 Powders", Jour. of the American Ceramic Soc., Columber, vol. 78, No. 2, Feb. 2, 1995, pp. 491-494, XP002165586.

(Continued)

*Primary Examiner*—Karl E Group

(57) ABSTRACT

The present invention relates to highly dense translucent and transparent aluminium oxide components for applications, e.g. in the lighting industry, where a fine crystal size has to be obtained and stabilized for use at temperatures of 800° C. or more. Disclosed are high-strength polycrystalline alumina products which include 0.001-0.5 weight-% $ZrO_2$ stabilizing a fine crystal size <2 μm or, preferably, <1 μm if used at temperatures of 800° C. or more. The microstructure exhibits an extremely high relative density enabling a high real in-line transmission >30% measured over an angular aperture of at most 0.5° at a sample thickness of 0.8 mm and with a monochromatic wavelength of light λ, preferably, of 645 nm.

10 Claims, 1 Drawing Sheet

U.S. PATENT DOCUMENTS

| | | | |
|---|---|---|---|
| 5,376,606 A | * | 12/1994 | Kim et al. .................... 501/153 |
| 5,382,556 A | * | 1/1995 | Takahashi et al. ........... 501/153 |
| 5,625,256 A | * | 4/1997 | Tiedt et al. .................. 313/636 |
| 5,682,082 A | * | 10/1997 | Wei et al. .................... 313/636 |
| 6,417,127 B1 | * | 7/2002 | Yamamoto et al. .......... 501/153 |
| 6,844,285 B1 | * | 1/2005 | Wei ............................. 501/152 |
| 2005/0156527 A1 | * | 7/2005 | Vries et al. .................. 313/634 |

FOREIGN PATENT DOCUMENTS

| | | | |
|---|---|---|---|
| EP | 0756586 | | 2/1997 |
| EP | 1053983 | | 11/2000 |
| EP | 1187175 | | 3/2002 |
| JP | 58-161968 | * | 9/1983 |
| JP | 6-211569 | * | 8/1994 |

OTHER PUBLICATIONS

H. Mizuta et al; "Preparation of High-Strength and Translucent Alumina by Hot Isostatic Pressing", Jour. of the American Ceramic Soc, Columbus, vol. 75, No. 2, Feb. 1992, pp.469-473, Feb. 1992, XP002165587.

K. Hayashi et al; "Transmission Optical Properties of Polycrystalline Alumina with Submicron Grains", Materials Trans Jim Sendaj, JP, vol. 32, No. 11, 1991. pp. 1024-1029.

"Anisotropy of Grain Growth in Alumina" Jurgen Rodel et al., Journal, J. Am Ceram, Soc. 73, No. 11, Dec. 1990. pp. 3292-3301.

"Preparation of High-Strength and Translucent Alumina" by Hot Isotatic Pressing, Hiroyuki Misuta, et al. Journal, pp. 469-473.

"Transmission Optical Properties of Polycrystalline Alumina with Submicron Grains" Koichi Hayashi et al., Materials Transactions, JIM, vol. 32, No. 11 (1991). pp. 1024-1029.

* cited by examiner

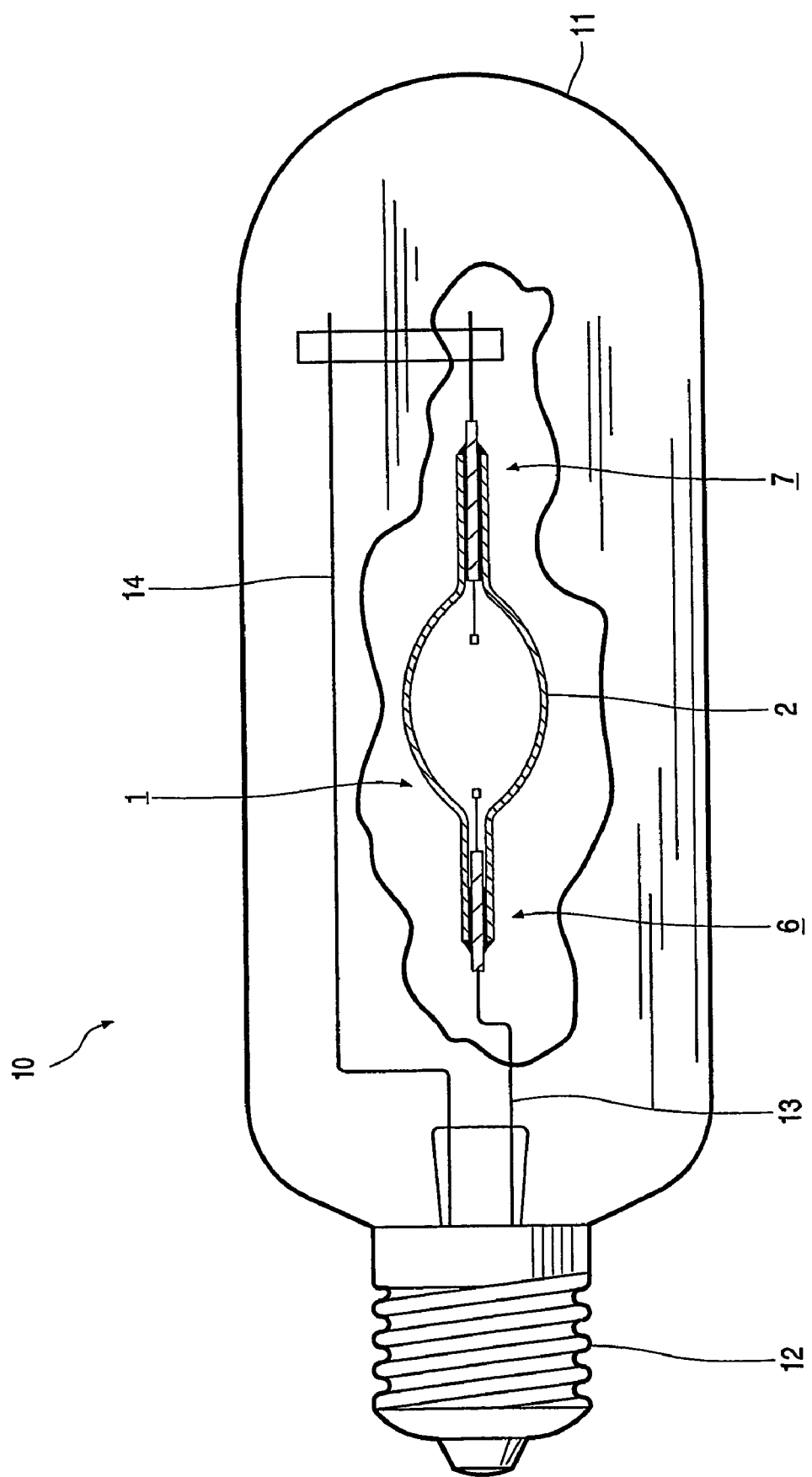

TRANSPARENT POLYCRYSTALLINE ALUMINIUM OXIDE

The invention relates to technical ceramics and to highly dense translucent and transparent aluminium oxide structures for applications, e.g. in the lighting industry, where a fine crystal size has to be obtained and stabilized for use at temperatures of 800° C. or more. The invention also relates to an electric lamp having a discharge tube with a wall of such a ceramic.

Sintered transparent alumina ceramics consisting of a chemically and thermodynamically stable corundum phase ($\alpha$-$Al_2O_3$) have been available for several decades. Traditionally, they are produced starting from very fine-grained transitional alumina raw powders and obtain a high sintering density by annealing at very high temperatures >1600° C. As a result, the ceramic microstructures are coarse with crystal sizes typically >15 µm. As a consequence of this coarse microstructure, these materials exhibit, even in thin components, only translucency but no transparency. Besides, the known ceramics have a relatively low bending strength, usually less than 300 MPa.

Transparency of a ceramic component is to be taken to mean herein that said ceramic component has a value for real in-line transmission RIT of at least 30%, the real in-line transmission RIT being measured over an angular aperture of at most 0.5° at a sample thickness of 0.8 mm and with a monochromatic wavelength of light $\lambda$.

In literature, optical properties are commonly determined using total forward transmission (TFT) and in-line transmission (IT), the latter being measured with commercially available spectrometers. As these have angular apertures of several degrees, the IT thus measured includes a large amount of multiple forward scattered light. As a consequence, for scattering samples, both TFT and IT will always result in values that are much higher than the RIT value for the same sample. Due to the multiple reflective character of the light measured with TFT and IT it is not possible to establish any quantitative relationship with the RIT. It is possible however to compare real in-line transmission values which have been taken from samples with a thickness other than 0.8 mm as defined above. For a sample 1 of thickness $d_1$ and RIT value $T_1$ and a second sample having a thickness $d_2$, the value $T_2$ of the RIT satisfies the relation $$T_2 = (1-R)*[T_1/(1-R)]^{d_2/d_1} \quad (1)$$

where R is the coefficient of surface reflection which for alumina is 0.14 (incorporating the reflection on both surfaces). Due to reflection losses a transmission value, either RIT, TFT or IT, cannot exceed a value of 86%.

The inventors have established that for a ceramic sample having a very small porosity as well as small pores, i.e. at least smaller than 0.01% and <100 nm respectively, the real in-line transmission RIT is correlated to the sample's structure. When measured according to the above-stated definition, the RIT obtained fulfills the expression $$RIT = (1-R)\exp\left(-\frac{3\pi^2 G d \Delta n^2}{2\lambda_0^2}\right), \quad (2)$$

where R is the coefficient of surface reflection (0.14 for $Al_2O_3$), d is the sample thickness, G is the average crystal size, $\Delta n$ is the effective birefringence of alpha-alumina (0.005) calculated as the weighted average of the refractive index differences between each of the main optical axes, and $\lambda_0$ is the wavelength of the monochromatic incident light in vacuum. At higher porosity percentages and larger pore sizes, the measured RIT results in significantly-smaller values than those predicted by the above expression.

To overcome a low bending strength with known ceramics, an early Japanese investigation applied a slip casting approach in combination with pressureless pre-sintering and hot-isostatic post-densification (HIP) to obtain high-strength, translucent sintered products with fine crystal sizes of 2-5 µm (H. Mizuta et al., J. Am. Ceram. Soc. 75(1992)2, 469-473). No RIT was measured but the maximum IT was 46% (at 1 mm sample thickness, visible to infrared light—no wavelength given) observed at an average crystal size of 5 µm and was associated with a 3-point bending strength of 786 MPa Only slight improvements were observed when the crystal sizes are reduced towards the sub-micrometer range as described by K. Hayashi et al. (Mater. Trans., JIM, 32(1991) 11, 1024-1029). Dense samples produced with an average crystal size of 0.82 µm by injection moulding, pre-sintering and HIP exhibited a strength of 812 MPa and an IT (at 500 nm wavelength) of 78%, recorded at a sample thickness of 0.5 mm.

The purity of the alumina in these Japanese investigations was 99.99%. The HIP process in these investigations is carried out at a temperature of about 1250 to 1280° C., giving rise to an additional difficulty, however, because if the ceramics are intended for use in a discharge lamp, a discharge tube of such a discharge lamp is operated at temperatures ranging from 1100 to 1300° C. Any technical use of these sintered products at temperatures similarly high or even higher than the HIP temperatures will unavoidably coarsen the above-described highly pure alumina microstructures. Whereas several additives like for instance MgO and $ZrO_2$ have been reported to retard crystal growth in annealing alumina ceramics, the precise effects are often unclear.

According to EP 1053983 A2, which relates to translucent polycrystalline ceramics with mean facet lengths not exceeding a maximum wavelength $\lambda$ of the light (which for $\lambda$=600 nm e.g. means a crystal size of about 0.6 µm since the facet length is about half of the average crystal size), an additive of only 0.05 mol-% $ZrO_2$ as a sinter dopant in transparent sintered alumina ceramics has a degenerating effect on the optical transmittance and on the strength and the hardness compared to samples without $ZrO_2$. For 0.5 mm thin discs and $\lambda$<800 nm, the measured value for the so-termed linear transmission, which in this case can be compared to the real in-line transmission RIT, decreases to 25% compared with a measured value of 40% for a zirconia-free microstructure with usual MgO dopant (0.1 mol-%). A RIT value of 25% for a thickness d of 0.5 mm corresponds according to the relation (1) to a value of 12% for a thickness d=0.8 mm. For a zirconia free microstructure the corresponding value for a thickness d=0.8 mm is 25%.

A transparent $Al_2O_3$ component with a value for the RIT of at least 30%, measured over an angular aperture of at most 0.5° at a sample thickness of 0.8 mm and with a monochromatic wavelength of light $\lambda$ and having an acceptable strength is therefore unknown. That is a problem. It is therefore the objective of the present invention to solve the problem and to provide a component by means of which the previously mentioned limitations are overcome.

The present invention provides high-strength translucent and transparent polycrystalline alumina components which include a zirconia ($ZrO_2$) additive to stabilize a fine crystal size $\leq$2 µm, or preferably <1 µm, for use at temperatures of 800° C. or more, with a high real in-line transmission >30%, preferably >40% and more preferably >50%, measured at a sample thickness of 0.8 mm, over an angular aperture of at most 0.5° and with a monochromatic wavelength of light λ of preferably 645 nm.

The result that a value of RIT >30% is obtained in spite of the presence of zirconia additives in concentrations that are large enough to prevent crystal growth upon high temperature annealing is surprising and clearly in disagreement with the previous state of the art. This is made possible here by the combination of very small crystal sizes and an extremely high relative density >99.95%, implying a very small residual porosity.

Disclosed are polycrystalline alumina components with at least initially an average crystal size <2 µm, a purity >99.5% $Al_2O_3$ and optionally containing up to 0.3 wt.-% of MgO, characterized by an additive of at least 0.001 wt-% $ZrO_2$ and by a relative density which at this $ZrO_2$ concentration is >99.95%, with a real in-line transmission RIT >30% measured at a sample thickness of 0.8 mm over an angular aperture of at most 0.5° and with a monochromatic wavelength of light λ of preferably of 645 nm.

Disclosed is also a process of manufacturing such new alumina ceramic components based on colloidal dispersion providing an extremely high degree of dispersion homogeneity obtained by the application of dispersing methods selected from the group of stirring, milling, and ultrasonification, and introducing at least 0.001 wt-% $ZrO_2$ additive either as a solution of a zirconium salt, as a finely dispersed $ZrO_2$ powder, or by wear from $ZrO_2$ containers, milling discs or beads followed by hot-isostatic pressing (HIP) as a post-densification treatment.

It is believed that sintering causes the $ZrO_2$ dopant to have two opposite effects on the microstructural development of the transparent alumina: the first effect being that grain boundary pinning reduces crystal growth of the $Al_2O_3$ crystals and may thus lead to an increase of the RIT characteristics of the sintered products; this effect prevails at lower concentrations and fine $ZrO_2$ crystal sizes <100 nm. On the other hand, the second effect is that $ZrO_2$ increases the temperature required for densification of $Al_2O_3$, and this higher temperature might be associated with crystal growth and decreasing RIT data. The inventors have observed, however, that increasing the $ZrO_2$ concentration from 0.001 to about 0.5 wt.-% will result in an increased value for the RIT of the thus formed alumina components to values as high as 69% despite an increase of the sintering temperature by 100-200° C. (with a constant temperature of the subsequent HIP treatment of 1200° C.). For a dopant concentration of less than 0.001 wt-% there was no practicable effect resulting in a continuation of crystal growth at temperatures of 800° C. and higher. Dopant concentrations above 0.3 wt-% up to 0.5 wt-% result in a further increase of the sintering temperature and hence lead to coarsening of the microstructure and thus have a lowering effect on the RIT, but still result in values for the RIT above 30%. However in this range an increase of the zirconia concentration goes hand in hand with a decrease of the RIT.

Concentrations >0.5 wt-% $ZrO_2$ result in decreased values for the RIT below 30%.

Preferably, in an embodiment of the invention the $ZrO_2$ additive has a concentration from 0.1 wt-% to 0.3 wt-% inclusive.

A preferred embodiment of the invention comprises polycrystalline alumina components with initially an average crystal size <1 µm and a real in-line transmission RIT >40% measured at a sample thickness of 0.8 mm measured over an angular aperture of at most 0.5° and with a wavelength of light λ of preferably 645 nm.

With their extremely homogeneous microstructure and their small sub-µm crystal size at a high relative density >99.95%, the alumina components exhibit outstanding mechanical properties. Their macrohardness HV10 (measured with a Vickers pyramid at a testing load of 10 kgf) is at least 19.5 GPa, and their 4-point bending strength is 550 MPa or more.

EXAMPLES

The invention is further elucidated by means of examples and with reference to a drawing which shows a discharge tube with a ceramic wall.

Example 1

An aqueous slurry with a solid loading of 41 wt.-% was prepared at pH=4 from TM-DAR corundum powder [average particle size 0.2 µm; make Boehringer Ingelheim Chemicals, Japan] without any further additives. A high degree of dispersion was obtained after at least 1 day of ultrasound or at least half a day of wet ball milling, using milling beads that could not give rise to contaminations other than alumina or oxydizable wear. The dopant $ZrO_2$ was then introduced by the addition of pure and finely grained $ZrO_2$ powder with a solid loading of 20%, dispersed in water and stabilized by nitrate ions. The average particle size of the dopant is preferably chosen smaller than the alumina crystal size obtained after sintering and HIP treatment. In the example described it was chosen to be 100 nm. Reference samples without $ZrO_2$ were prepared in the same way, except that no dopant was added.

The suspensions thus obtained were, without further degassing, either pressure cast at a pressure of 4 bar using a Millipore hydrophilic membrane with an average pore diameter of 50 nm, or slip cast on a porous mould with an average porosity of about 50% and an average pore size of about 100 nm. After consolidation the pellets were dried in air for about 4 hours and subsequently further dried in a stove at a temperature of 80° C. for more than 4 hours. The dried compacts were calcined at 600° C. for 2 hours in pure oxygen to remove impurities. Hereafter the pellets were sintered at a sinter temperature ($T_s$) ranging from 1150° C. to 1350° C. in either oxygen, vacuum or humidified hydrogen (dew point 0° C.). Pellets with a density higher than 96% were given a subsequent HIP treatment at a temperature of 1200° C. and a pressure of 200 Mpa for at least 2 hours. The pellets were ground on both parallel sides, first with successively finer diamond grains of finally 3 µm. The final thickness of the discs was 0.8 mm.

The real in-line transmission (RIT) of the samples was measured using a red diode laser with a wavelength λ of 645 nm and a detector at a distance from the illuminated sample of at least 1 meter to ensure an angular aperture of 0.5°. Also the total forward transmission (TFT) was measured. The results are shown in Table I.

TABLE I

| Sample no | $ZrO_2$ Wt-% | $T_s$ (° C.) | Density after sintering (%) | HIP-time (h) | RIT (%) | TFT (%) |
|---|---|---|---|---|---|---|
| 1 | 0 | 1200 | 97.7 | 2 | 46.7 | 77.6 |
| 2 | 0 | 1250 | 99.7 | 2 | 45.1 | 74.9 |
| 3 | 0.01 | 1250 | 97.4 | 2 | 56.3 | 75.5 |
| 4 | 0.01 | 1300 | 99.6 | 2 | 49.9 | 73.4 |
| 5 | 0.04 | 1300 | 98.0 | 2 | 60 | 75.4 |
| 6 | 0.04 | 1350 | 99.9 | 2 | 47.1 | 72.8 |

TABLE I-continued

| Sample no | ZrO$_2$ Wt-% | T$_s$ (° C.) | Density after sintering (%) | HIP-time (h) | RIT (%) | TFT (%) |
|---|---|---|---|---|---|---|
| 7 | 0.1 | 1320 | 96.5 | 2 | 61.4 | 75.2 |
| 8 | 0.1 | 1350 | 99.7 | 2 | 59.2 | 76.1 |
| 9 | 0.3 | 1300 | 97.8 | 24 | 69.2 | 76.8 |
| 10 | 0.3 | 1350 | 100 | 24 | 55.6 | 73.2 |
| 11 | 0.5 | 1350 | 98.5 | 24 | 47.9 | 65.4 |
| 12 | 0.5 | 1400 | 99.3 | 24 | 20.9 | 48.8 |
| 13 | 1.0 | 1350 | 98.4 | 24 | 15.5 | 42.9 |
| 14 | 1.0 | 1400 | 98.7 | 24 | 3.5 | 29.4 |

The samples bearing nos. 1, 3, 5, 7, 9, 11 and 13 were sintered at a lower range of possible sinter temperatures, however it turned out that a minimum density of 96% was still achieved before the HIP treatment. A comparison of these samples shows that up to 0.3 wt-% zirconia oxide the RIT value increases with increasing zirconia concentration, which is unlike the state of the art. Apparently the resulting crystal size becomes smaller with increasing dopant, notwithstanding an increase in required sinter temperature. On the other hand the results in Table I show that for an equal amount of dopant an increase of the sinter temperature will in general result in a lower value for the RIT. This is significant in particular in the case of a low dopant content and at dopant concentrations above 0.3 wt-%. A comparison of the results of the samples 11 and 12 teaches that at the upper limit of the zirconia oxide concentration of 0.5 wt-%, a slight increase of the sinter temperature results in a dramatic drop in the resulting value for the RIT to below 30%.

From the results of the samples 13 and 14 it is evident that an increase of the zirconia oxide dopant to a value above 0.5 wt-% will not result in a ceramic body with the properties according to the invention.

As high intensity discharge lamps like sodium and metal halide lamps are operated at temperatures ranging between 1100° C. and about 1300° C., the influence of an increased temperature on the crystal size is important. Further samples have therefore been prepared including a HIP treatment at 1200° C. and have then been treated at increased temperatures for some time after which the average crystal size was measured again. The result is shown in Table II.

TABLE II

| Annealing temperature for 24 hours (° C.) | Average crystal size (μm) | |
|---|---|---|
| | 0 wt % ZrO$_2$ | 0.1 wt % ZrO$_2$ |
| 1225 | — | 0.44 |
| 1250 | 1.09 | — |
| 1275 | 1.49 | — |
| 1300 | 1.89 | 0.69 |
| 1350 | — | 1.05 |
| 1400 | — | 2.46 |
| 1450 | — | 4.19 |

Table II shows that a ZrO$_2$ concentration significantly retards the increase of the average crystal size and thus has a favorable influence on maintaining a high value for the RIT.

In another simulation, the longer-term influence of increased temperature on the crystal size has been investigated. The simulation is based on the model as disclosed in J. Am. Ceram. Soc. 73(1990) 11, 3292-3301. The effect on a sample having a ZrO$_2$ doping of 0.1 wt % is shown in Table III.

TABLE III

| Temperature (° C.) | Average crystal size (μm) | | | |
|---|---|---|---|---|
| | 24 hours | 100 hours | 1000 hours | 10.000 hours |
| 1100 | 0.44 | 0.44 | 0.44 | 0.45 |
| 1150 | 0.44 | 0.44 | 0.45 | 0.53 |
| 1200 | 0.44 | 0.45 | 0.55 | 0.97 |
| 1250 | 0.47 | 0.56 | 0.99 | 2.08 |

The results in Table III clearly show that the enduring effect of the ZrO$_2$ on the retardation of crystal growth under temperature conditions prevailing in operative lamps results in life times of the sample having average crystal sizes <2 μm that are comparable to common lamp lifetimes.

Example 2

An aqueous slurry with a solid loading of 75 wt.-% and a monomer content of 3.5% (acrylamide [AM] with n,n'-methylene-bis-acrylamide [MBAM] at a weight ratio AM:MBAM of 24:1) was prepared at pH=4 (adjusted with HNO$_3$) from TM-DAR corundum powder [average particle size 0.2 μm; make Boehringer Ingelheim Chemicals, Japan] with an additive of 0.03 wt.-% MgO (introduced as an equivalent amount of commercial spinel Baikalox-S30CR [make Baikowski Chimie, France]). As is known e.g. from EP-756586B1 (Krell et al.), a high degree of dispersion is obtained by the combined use of several methods, here by stirring for 1 h with simultaneous ultrasonification and subsequent vibration milling for 20 h in a closed polyamide container under a reduced pressure of 60 mbar. During milling, 0.2 wt.-% ZrO$_2$ was introduced by wear of the used commercial ZrO$_2$ beads.

Reference samples without ZrO$_2$ were prepared similarly by stirring for 1 h with simultaneous ultrasonification and subsequent attrition milling for 4 h with 99.99% pure submicrostructured Al$_2$O$_3$ beads (product of IKTS Dresden) using a container and milling discs of polyethylene.

A quantity of 0.04 wt-%o of (NH$_4$)$_2$S$_2$O$_8$ (concentration related to Al$_2$O$_3$) were added as an initiator after milling. After casting flat discs in glass moulds, final degassing of the slurries was achieved at reduced pressure of 200 mbar (air) for 3 h. For consolidation of the slurries, the temperature was then raised to 60° C. to start polymerization (promoted by the added initiator). This procedure is similar to the approach known from EP-756586B1 (Krell et al.).

The wet cast bodies were dried in ambient air for 2 days and then annealed at 800° C. in air to remove the organic additives. During sintering in air for 2 h at 1340° C. the relative density of the ZrO$_2$-doped samples was increased to 97%, whereas without ZrO$_2$ a lower temperature of 1290° C. was sufficient to obtain a closed porosity at a density of 96%. A final density of >99.9% was achieved by hot isostatic pressing (HIP) in argon at 1300° C./12 hours for the ZrO$_2$-doped material. Without ZrO$_2$ doping the HIP conditions were 1200° C./12 h. The average crystal sizes of the transparent corundum microstructures are given by Tab. IV, showing optical data of MgO-doped Al$_2$O$_3$ samples (0.03% MgO), some of them co-doped with zirconia, after HIP and after annealing. After annealing at 1350° C., only the microstructures without ZrO$_2$ exhibit some larger crystals i.e. >1.3μm. The particle sizes of most of the ZrO$_2$ crystals after HIP range between 30 and 100 nm where, for example. the ZrO$_2$ dopant has an average particle size of at most 100 nm.

After HIP, the diameter of the discs was 28 mm at a thickness of 3 mm. These discs were ground on both parallel sides, first with a diamond wheel having a 91 μm grain size and then with a diamond wheel having a finer grain size of 46 μm. To further reduce the surface roughness, the discs were lapped and polished using successively finer diamond grains of 9, 6 and finally 3 μm. The final thickness of the discs was 0.8 mm.

The real in-line transmission (RIT) and total forward transmission (TFT) were determined with red light (645 nm) with a spectrophotometer type: LCRT-2006-06R/T; make Gigahertz-Optik Corp. An immersing liquid was used to minimize the influence of surface roughness. The real in-line transmittance was recorded over an angular aperture of 0.5° from a straight-line axis. The accuracy of the results for RIT and TFT is in the range of ±1% (absolute % units of the transmission data).

Table IV compares the RIT and TFT results of $ZrO_2$-doped samples according to the present, example 2 with a $ZrO_2$-free reference: Table IV shows that a $ZrO_2$ concentration of 0.2% significantly retards the decrease of RIT in the case of high temperature annealing.

Table IV show that, unlike the effect on RIT, the effect of annealing on TFT, either with or without $ZrO_2$ doping, is small.

TABLE IV

|  | as sintered (after HIP) 0% $ZrO_2$ + 0.2% $ZrO_2$ | annealed 1300° C./ 10 h 0% $ZrO_2$ + 0.2% $ZrO_2$ | Annealed 1300° C./10 h + 1350° C./10 h 0% $ZrO_2$ + 0.2% $ZrO_2$ |
|---|---|---|---|
| Average grain size | 0.62 μm 0.50 μm | not determ. 0.51 μm | 1.14 μm 0.67 μm |
| RIT | 51.1% 64.4% | 41.0% 61.2% | 30.6% 42.9% |
| TFT | 82.6% 80.6% | 81.3% 82.6% | 80.4% 76.5% |

The hardness HV10 of the samples doped with $ZrO_2$ was 19.6 GPa after HIP, their 4-point bending strength was 638±51 MPa.

Example 3

A discharge tube was made by slip casting of a slurry prepared according to the process as described in example 1, with 0.04 wt-% $ZrO_2$. The shaped body thus formed was sintered at a sinter temperature of 1300° C. during 2 hours, after which it was given an HIP treatment for 2 hours at a temperature of 1200° C.

A lamp was made from the discharge tube thus formed. An example of a discharge lamp having a discharge tube made of alumina according to the invention is described with reference to a drawing. The drawing shows a lamp 10 with a discharge tube 1 having a ceramic wall 2 of a transparent ceramic according to the invention. The lamp is provided with a partly broken away outer bulb 11. The discharge tube of the lamp is provided with electrodes 60, 70, which are connected to current conductors 13, 14 by leadthrough constructions 6, 7 known in the art. The current conductors are connected in a conventional way to electric contacts of a lamp base 12.

In a further experiment, an increased HIP temperature of 1400° C. was used to manufacture translucent envelopes with maximum total light transmittance from gel cast samples prepared according to Example 2. The average crystal size of these samples was 0.7 μm after 30 min of isothermal HIP and 1.5 μm after 5 h of isothermal HIP. The wall thickness of these samples was 1 mm, and there was no polish on the outer side or on the inner side of the envelopes. After 5 h HIP, the total light transmittance was 95% and the average bending strength 590 Mpa (4-point bending of bar samples). The stability of the total light transmittance in the case of annealing is close to that of the TFT data in Table IV.

The invention claimed is:

1. Polycrystalline alumina components optionally containing MgO in a concentration of at most 0.3 wt-%, wherein the alumina contains a concentration from 0.1 to 0.5 wt-% inclusive $ZrO_2$ as an additive and has an average crystal size ≦2μm, a relative density higher than 99.95%, with a real in-line transmission RIT ≧30% measured over an angular aperture of at most 0.5° at a sample thickness of 0.8 mm and with a monochromatic wavelength of light λ, and wherein the $ZrO_2$ additive has an average particle size of at most 100 nm.

2. The polycrystalline alumina components according to claim 1, wherein the average crystal size is ≦1 μm and the real in-line transmission RIT is at least 40%.

3. The polycrystalline alumina components according to claim 1, wherein the $ZrO_2$ additive is in a concentration from 0.1 wt-% to 0.3 wt-%, inclusive.

4. A discharge lamp comprising a discharge tube having a wall of a ceramic as claimed in claim 1.

5. The discharge lamp according to claim 4 wherein the discharge tube has an ionisable filling containing a metal halide.

6. Polycrystalline alumina components comprising alumina which contains $ZrO_2$ in a concentration between 0.1 to 0.5 wt-% inclusive as an additive, wherein the alumina has an average crystal size ≦2 μm, and has a relative density higher than 99.95%, and wherein the additive has an average particle size of at most 100 nm.

7. The polycrystalline alumina components of claim 6, wherein the alumina contains MgO in a concentration of at most 0.3 wt-%.

8. A discharge lamp comprising a discharge tube having a wall of a ceramic as claimed in claim 6.

9. The polycrystalline alumina components of claim 6, wherein transparency of the alumina is at least 30% having a real in-line transmission RIT≧30% measured over an angular aperture of at most 0.5° at a sample thickness of 0.8 mm and with a monochromatic wavelength of light μ.

10. The polycrystalline alumina components of claim 6, having a real in-line transmission RIT based on a following relationship:

$$RIT = (1 - R)\exp\left(\frac{3\pi^2 G d \Delta n^2}{2\lambda_0^2}\right)$$

where
R is a coefficient of surface reflection,
d is the sample thickness,
G is the average crystal size,
Δn is an effective birefringence of alpha-alumina calculated as a weighted average of refractive index differences between each of main optical axes, and
$\lambda_0$ is the monochromatic wavelength of the light in vacuum.

* * * * *